United States Patent [19]

Burger et al.

[11] Patent Number: 5,058,920
[45] Date of Patent: Oct. 22, 1991

[54] METHOD FOR ACTUATING A SAFETY DEVICE FOR VEHICLE OCCUPANTS

[75] Inventors: Wilfried Burger, Hemmingen; Werner Nitschke, Ditzingen; Peter Taufer, Renningen; Hugo Weller, Oberriexingen, all of Fed. Rep. of Germany

[73] Assignee: Robert Bosch GmbH, Stuttgart, Fed. Rep. of Germany

[21] Appl. No.: 490,651
[22] PCT Filed: Sep. 5, 1987
[86] PCT No.: PCT/DE88/00378
 § 371 Date: Mar. 1, 1990
 § 102(e) Date: Mar. 1, 1990
[87] PCT Pub. No.: WO89/02377
 PCT Pub. Date: Mar. 23, 1989

[30] Foreign Application Priority Data

Sep. 5, 1987 [DE] Fed. Rep. of Germany ....... 3729785

[51] Int. Cl.⁵ .............................................. B60R 21/16
[52] U.S. Cl. .................................................... 280/735
[58] Field of Search ................ 307/10.1; 280/735, 734, 280/728; 180/197, 271; 318/560

[56] References Cited

U.S. PATENT DOCUMENTS 3,980,318  9/1976  Balban ................................. 280/735
4,110,812  8/1978  Arutunian et al. .................. 361/248
4,163,268  7/1979  Spies et al. .......................... 280/735
4,243,971  1/1981  Suchowerskyj et al. ......... 340/52 H
4,384,734  5/1983  Yasui .................................... 280/735

FOREIGN PATENT DOCUMENTS 2267221 11/1975 European Pat. Off. .
  27747  4/1981 European Pat. Off. .
2454424  5/1976 Fed. Rep. of Germany .
2851333  6/1980 Fed. Rep. of Germany .
3616975 11/1987 Fed. Rep. of Germany .
 42736  4/1979 Japan ................................... 280/735

Primary Examiner—Charles A. Marmor
Assistant Examiner—Tamara L. Finlay
Attorney, Agent, or Firm—Kenyon & Kenyon

[57] ABSTRACT

A method of actuating a safety device for vehicle occupants, wherein the safety device has several tripping devices coupled to a capacitor and to passenger restraint devices, such as air bags, seat belts, or the like. The energy supplied by the capacitor to a tripping device is measured upon actuation of that device. If the energy supplied exceeds a predetermined limit, the flow of electric current from the capacitor to the respective tripping device is interrupted. Thus, if an actuated tripping device shunts, the energy of the capacitor is not drained by the shunt, and the capacitor maintains an energy level sufficient to actuate the other tripping devices.

22 Claims, 2 Drawing Sheets

METHOD FOR ACTUATING A SAFETY DEVICE FOR VEHICLE OCCUPANTS

FIELD OF THE INVENTION

The present invention relates to safety devices for motor vehicles and, in particular, to passenger restraint devices and methods and apparatus for actuating passenger restraint devices, such as air bags and seat belts.

BACKGROUND INFORMATION

German patent application DE-A-2851333 shows a vehicle safety device that uses electrically actuated tripping devices to actuate a passenger restraint device, such as an air bag. The tripping devices are typically ignition tablets. When electric current flows through an ignition tablet, the tablet ignites and thus actuates the restraint device. If the main power source for the safety device is disconnected during a collision, for example, an electric storage device supplies electric current to ignite the ignition tablet.

One problem with such known safety devices, is that ignition tablets frequently shunt; that is, once the ignition table is ignited, it is not completely destroyed. As a result, electric current continues to flow through the ignition tablet. This problem is particularly critical if the main power source is disconnected and several ignition tablets must be ignited one after the other by the storage device. If one of the ignition tablets shunts, it can drain the energy from the storage device before the remaining ignition tablets are ignited. As a result, the remaining restraint devices, such as air bags, cannot be actuated to protect the passengers in the vehicle.

The solution of the present invention avoids the disadvantages of shunts occurring in actuated tripping devices to reliably actuate additional tripping devices, despite the limited energy reserve of a storage device.

SUMMARY OF THE INVENTION

The present invention is directed to a method of actuating a vehicular passenger restraint device, comprising the following steps: directing electric current from a storage device to an actuating device to actuate the actuating device and in turn the passenger restraint device; measuring the energy supplied by the storage device to the actuating device; and if the energy supplied to the actuating device is greater than a predetermined amount, interrupting the flow of electric current to the actuating device to maintain a substantially predetermined amount of energy within the storage device to actuate other actuating devices. In one method of the present invention, the amount of energy supplied to the actuating device is measured by measuring the voltage across the storage device. In another method of the present invention, the amount of energy supplied to the actuating device is measured by measuring the voltage across the actuating device. Upon actuating the passenger restraint device, if there is voltage across the actuating device, the flow of electric current therethrough is interrupted.

In another method of the present invention, the amount of energy supplied to the actuating device is measured by measuring the electric current flow therethrough. If upon actuating the passenger restraint device, electric current continues to flow through the actuating device, the flow of electric current therethrough is interrupted.

The present invention is also directed to an apparatus for actuating a plurality of passenger restraint devices mounted on a motor vehicle. The apparatus comprises an electric storage device coupled to the passenger restraint devices to supply electric current thereto to actuate the restraint devices. The apparatus further comprises first means for monitoring the energy supplied by the storage device to a respective restraint device, to maintain a sufficient amount of energy in the storage device to actuate other restraint devices. The apparatus preferably further comprises second means coupled to the first means and to the passenger restraint devices. The second means is responsive to the first means for interrupting the flow of electric current to a respective restraint device.

In one apparatus of the present invention, the first means includes a first volt meter coupled to the storage device to generate output signals indicative of the voltage across the storage device. The second means compares the output signals of the first volt meter to corresponding reference values. If an output signal falls below a corresponding reference value, the second means interrupts the flow of electric current to a respective restraint device.

In another apparatus of the present invention, the first means includes a plurality of second volt meters. Each second volt meter is coupled to a respective passenger restraint device to generate output signals indicative of the voltage across the respective restraint device. The second means is adapted to interrupt the flow of electric current to a restraint device, if upon actuating of that device, the respective second volt meter indicates a voltage across that device.

In another apparatus of the present invention, the first means includes a plurality of amp meters. Each amp meter is coupled to a respective passenger restraint device to generate output signals indicative of the electric current flowing through the respective restraint device. The second means is adapted to interrupt the flow of electric current to a restraint device, if upon actuation of that device, the respective amp meter indicates electric current flowing through that device.

The present invention is also directed to another apparatus for actuating a plurality of passenger restraint devices mounted on a motor vehicle. The apparatus comprises an electric storage device coupled to the passenger restraint devices to supply electric current thereto to actuate the devices. A first volt meter is coupled to the electric storage device to generate output signals indicative of the voltage across the storage device. A control unit is coupled to the first volt meter and the passenger restraint devices.

The control unit is adapted to compare the output signals of the first volt meter to corresponding reference values, upon actuation of a restraint device. If an output signal is less than a corresponding reference value, the control unit interrupts the flow of electric current to the respective restraint device. The apparatus thus maintains sufficient energy in the storage device to actuate other restraint devices.

One advantage of the present invention, is that safety devices for vehicle occupants can be reliably operated. The energy of the storage device is allocated to each respective tripping device. When a predetermined level of energy is exceeded, the flow of electric current from the storage device to a respective tripping device is interrupted. Thus, if an actuating device, which is typically an ignition tablet, shunts, the flow of electric current to the respective actuating device is interrupted. As a result, the actuating device does not drain the storage device, which is typically a capacitor. The capacitor therefore is permitted to maintain a sufficient amount of energy to actuate the other passenger restraint devices, such as air bags, and therefore protect the passengers in the vehicle during a collision.

Other advantages of the apparatus and method of the present invention will become apparent in view of the following detailed description and drawings taken in connection therewith.

DETAILED DESCRIPTION

Figure 1:
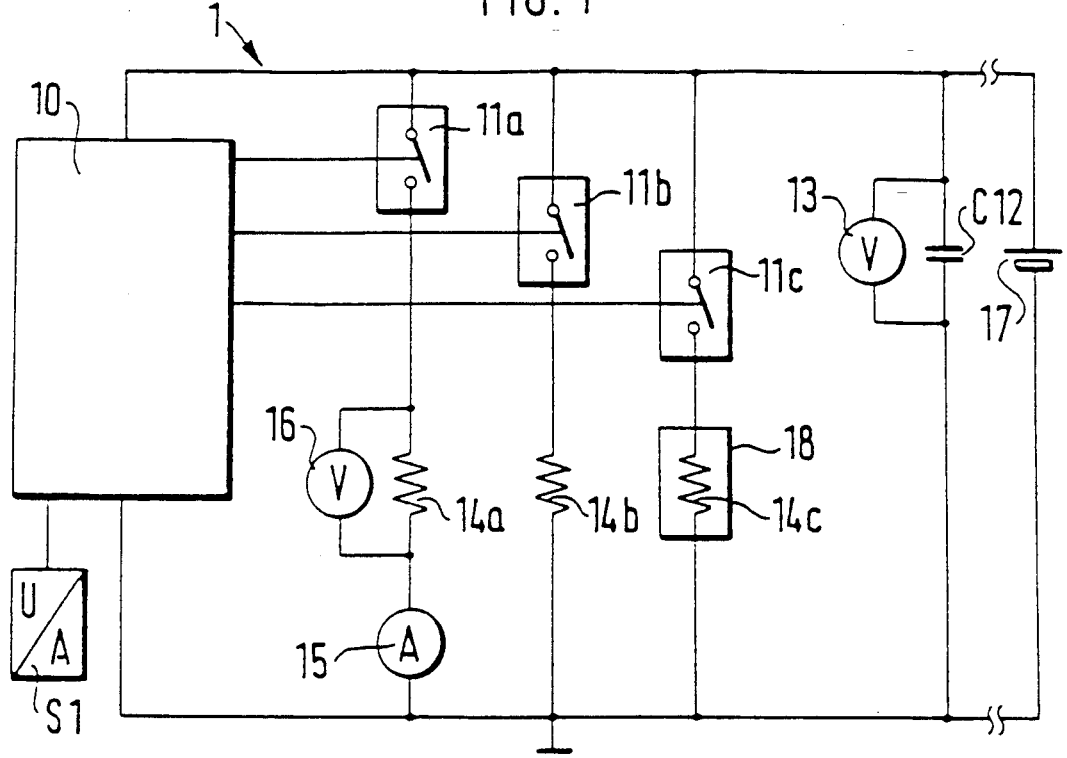
FIG. 1 is a schematic illustration of a passenger restraint apparatus embodying the present invention.

In FIG. 1, a passenger restraint apparatus embodying the present invention is indicated generally by the reference numeral 1. The apparatus 1 is mounted on a motor vehicle (not shown) and comprises an acceleration sensor S1, coupled to an evaluating device 10, both known to those skilled in the art.

The acceleration sensor S1 generates output signals corresponding to the acceleration of the vehicle. If the vehicle is in a collision, the acceleration sensor S1 generates output signals indicative of the deceleration of the vehicle. The evaluating device 10 analyzes the output signals of the sensor S1. If, for example, the value of the output signal of the sensor S1 is above a threshold value, thus indicating a collision, the evaluating device 10 actuates one or more passenger restraint devices, as described further below.

The passenger restraint apparatus 1 further comprises several contact switches 11a, 11b and 11c. The contact switches are electrically coupled in parallel to the evaluating device 10, and in parallel with respect to each other. Each contact switch is opened and closed in response to signals generated by the evaluating device 10. Several tripping devices 14a, 14b and 14c are each electrically coupled in series with the contact switches 11a, 11b and 11c, respectively. Each tripping device 14a, 14b and 14c is preferably an ignition tablet, known to those skilled in the art. Each ignition tablet operates so that when electric current flows therethrough, heat is generated and the tablet is ignited. The ignition of the tablet causes the tablet to emit a pressurized gas.

Each ignition tablet 14a, 14b and 14c is coupled to a passenger restraint device 18, such as an air bag, illustrated schematically in FIG. 1 (only one shown) When an ignition tablet is ignited, the pressurized gas emitted therefrom inflates the respective air bag 18, to protect the passengers in the vehicle during a collision.

The apparatus 1 further comprises a voltage source 17, which is typically the vehicle's battery. The battery 17 is electrically coupled in parallel with the evaluating device 10, and each of the respective contact switches 11a, 11b and 11c and tripping devices 14a, 14b and 14c. When the evaluating device 10 closes a respective contact switch, electric current from the vehicle battery 17 flows through the respective switch and ignition tablet. The heat generated by the resistance of the ignition tablet to the electric current causes it to ignite. The ignition tablet then emits pressurized gas which, in turn, inflates a respective air bag to protect the passengers in the vehicle.

It is not uncommon, however, for a vehicle battery 17 to become disconnected from the other components of the passenger restraint apparatus 1 during a collision. Therefore, the apparatus 1 further comprises a storage device C12, which is preferably a capacitor. The capacitance of the capacitor C12 is selected so that if the vehicle battery 17 is disconnected from the apparatus 1, the capacitor C12 can be used to ignite one or more of the ignition tablets 14a, 14b and 14c.

Generally, when an ignition tablet is ignited, the tablet is destroyed, thus interrupting the flow of electric current therethrough. However, sometimes an ignition tablet is not completely destroyed, but shunts, as described above. In such a case, the ignition tablet permits electric current to continue to flow therethrough. If an ignition tablet powered by the capacitor C12 shunts, it can drain the capacitor. This problem is extremely critical if the evaluating device 10 is operated to actuate several passenger restraint devices, such as the air bags 18, one after the other. If one of the ignition tablets shunts, it can drain the capacitor C12 and thus prevent the other passenger restraint devices from being actuated.

The method and apparatus of the present invention overcomes this problem by determining the available voltage across the capacitor C12 and/or whether there is a voltage potential across (or electric current flowing through) an ignition tablet 14a, 14b or 14c after it is ignited. If so, the evaluating device 10 is operated to open the respective contact switch 11a, 11b or 11c to interrupt the current flow and thus avoid draining the capacitor C12, as described further below.

The apparatus 1 further comprises a volt meter 13 electrically coupled to the capacitor C12 and to the evaluating device 10. The volt meter 13 generates output signals indicative of the voltage across the capacitor C12. The evaluating device 10 responds to the output signals to control the respective contact switches 11a, 11b and 11c, as described further below.

As shown in FIG. 1, the passenger restraint apparatus 1 further comprises several second volt meters 16 (only one shown). Each volt meter 16 is electrically coupled to a respective ignition tablet 14a, 14b or 14c, and to the evaluating device 10. The volt meters 16 each generate output signals indicative of the voltage across the respective ignition tablet. The evaluating device 10 in turn controls the respective contact switches in response thereto, as described further below.

The passenger restraint apparatus 1 further comprises several amp meters 15, as shown in FIG. 1 (only one shown). Each amp meter 15 is electrically coupled in series with a respective ignition tablet 14a, 14b or 14c, and is also electrically coupled to the evaluating device 10. Each amp meter 15 generates output signals indicative of the electric current flowing through the respective ignition tablet 14a, 14b or 14c. The evaluating device 10 in turn controls the operation of the contact switches in response thereto, as described further below.

Figure 4:
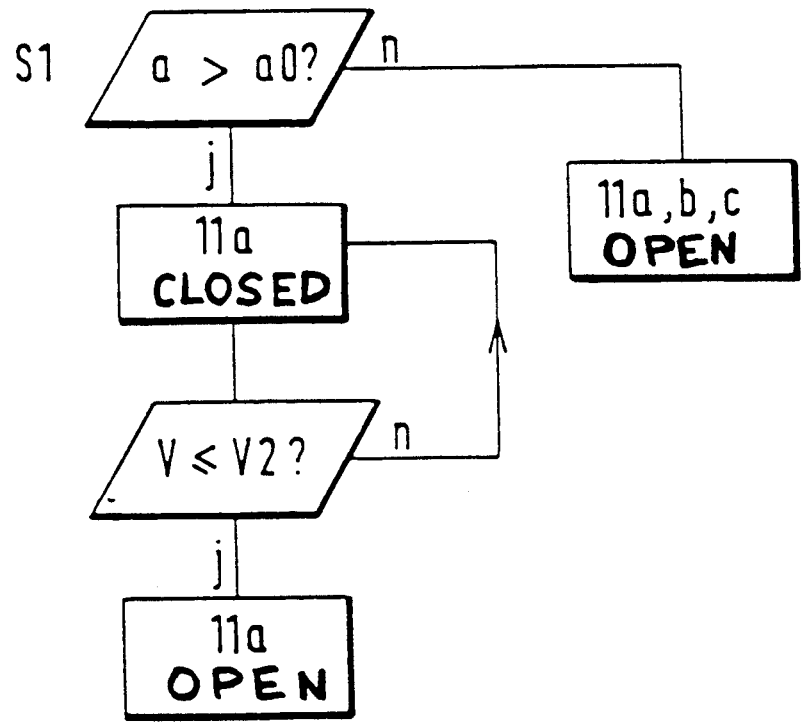
FIG. 4 is a flow chart illustrating conceptually the operation of the apparatus of FIG. 1.

In FIG. 4, the operational steps of the evaluating device 10 in accordance with the present invention are illustrated conceptually. If the output signal "a" of the acceleration sensor S1 is greater than a threshold value "a0", the evaluating device 10 actuates one or more of the contact switches 11a, 11b, 11c. The electric current flowing from the battery 17 then flows through each ignition tablet coupled to each closed contact switch to ignite the ignition tablet, and thus actuate the passenger restraint device 18. If, however, the output signal of the acceleration sensor S1 is below the threshold value "a0", thus indicating a non-collision situation, then the evaluating device 10 maintains each contact switch in an open position, as illustrated in FIG. 4. The passenger restraint devices 18 are therefore not actuated.

Figure 2:
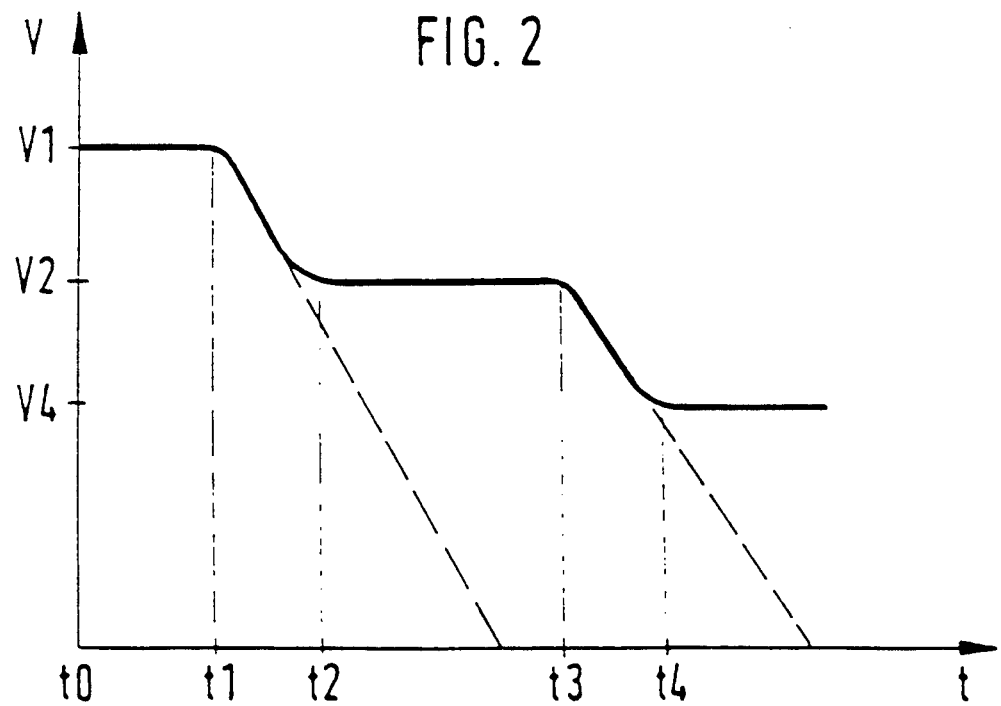
FIG. 2 is a graph illustrating the voltage across the capacitor of the apparatus of FIG. 1 with respect to time during a vehicle collision.

In the operation of the apparatus 1, the battery 17 maintains the voltage across the capacitor C12 at a level V1, as illustrated in FIG. 2. If during a collision the battery 17 is disconnected from the other components of the apparatus 1, then the capacitor C12 supplies the electric current to actuate the restraint devices 18. Therefore, as shown in FIG. 2, at time T1, when the contact switch 11a is closed and therefore the ignition tablet 14a is ignited, the voltage across the capacitor C12 begins to fall. At time T2, when the ignition tablet 14a is fully ignited, the voltage across the capacitor C12 drops to a value V2. If, however, the 30 ignition tablet 14a shunts at about time T2, the voltage across the capacitor C12 would continue to decrease until reaching a zero value before time T3, as indicated by the dashed line in FIG. 2. In such a case, the other two ignition tablets 14b and 14c could not then be ignited.

This problem is avoided, however, because the energy supplied by the capacitor C12 to each respective ignition tablet 14a, 14b and 14c is measured by the evaluating device 10. Therefore, at about time T2, when the ignition tablet 14a is fully ignited, the evaluating device 10 measures the amount of energy supplied by the capacitor C12 to that ignition tablet. The measurement is based on the output signals of the volt meter 13, as shown in FIG. 4, and/or the respective volt meter 16 and amp meter 15.

If the voltage across the capacitor C12 is equal to or below the voltage value V2, as indicated by the volt meter 16, then the evaluating device 10 opens the contact switch 11a, as indicated in FIG. 4. Likewise, if there is a voltage potential across the ignition tablet 14a or current flow therethrough, as indicated by the respective volt meter 16 or amp meter 15, then the evaluating device 10 opens the contact switch 11a. The flow of current to the ignition tablet 14a is thus interrupted, and the voltage of the capacitor C12 is maintained at the value V2. If, on the other hand, the voltage across the capacitor C12 is maintained at or above the value V2, or if there is substantially no voltage across the ignition tablet 14a or current flow therethrough, then the contact switch 11a is maintained in a closed position, as further indicated in FIG. 4.

Then, at time T3, if the evaluating device 10 is required to actuate the next restraint device 18, the voltage V2 across the capacitor C12 is sufficient to ignite the ignition tablet 14b. When the contact switch 11b is closed, the voltage across the capacitor C12 then begins to drop to a lower value, as shown in FIG. 2. Then, at about time T4, when the ignition tablet 14b is fully ignited and the respective restraint device 18 is actuated, the voltage across the capacitor C12 drops to a value V4, as shown in FIG. 2.

If, however, the second ignition tablet 14b shunts, then the voltage across the capacitor C12 would fall to a zero value, as indicated by the dashed line in FIG. 2. However, the evaluating device 10 continues to measure the voltage across the capacitor C12, and/or the voltage across the ignition tablet 14b or current flowing therethrough, based on the output signals of the volt meter 13 and/or respective volt meter 16 and amp meter 15. If the voltage across the capacitor C12 is at or above the value V4, then the contact switch 11b is maintained in an open position. However, if the voltage value falls below that level, then the contact switch 11b is opened to interrupt the flow of current therethrough. Likewise, if there is a voltage potential across the ignition tablet 14b or current flow therethrough, the contact switch 11b is opened. As a result, a sufficient amount of energy is maintained within the capacitor C12 (voltage value V4), to ignite yet another passenger restraint device 18.

The evaluating device 10 can include a comparator (not shown), known to those skilled in the art, which compares the output signals of the volt meter 13 to corresponding reference values. If a measured value falls below a corresponding reference value, then the evaluating device 10 is operated to open the respective contact switch 11a, 11b or 11c.

Figure 3:
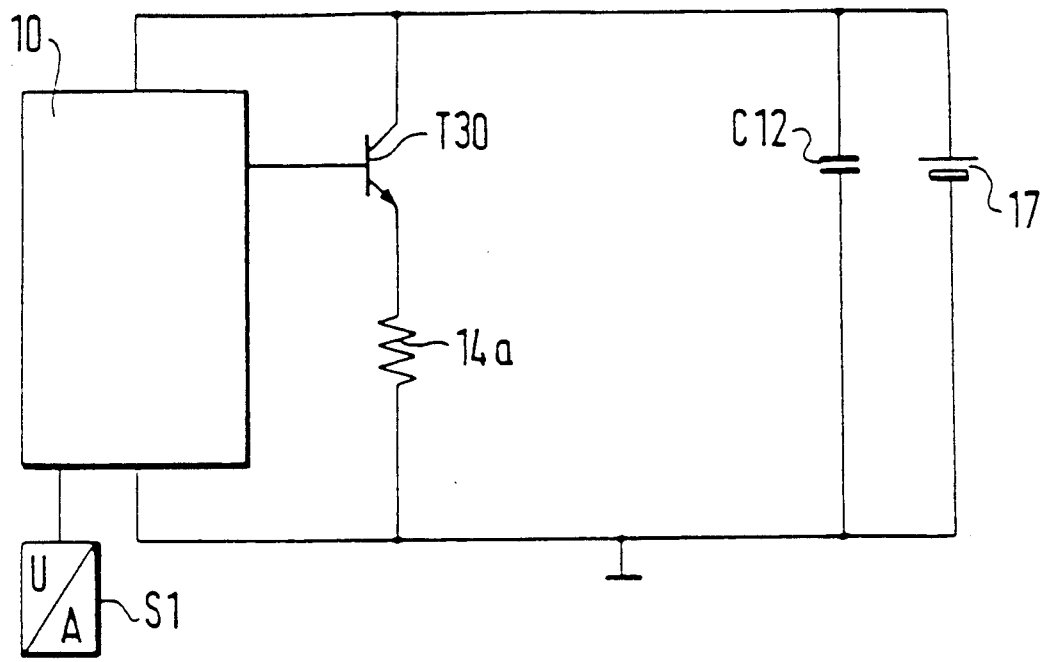
FIG. 3 is a schematic illustration of another passenger restraint apparatus embodying the present invention.

In FIG. 3, another embodiment of a passenger restraint apparatus embodying the present invention is illustrated. The apparatus of FIG. 3 is substantially the same as the apparatus 1 described above with reference to FIG. 1. Therefore, like reference numerals are used to indicate like elements. The apparatus of FIG. 3 differs from the apparatus described above, in that it employs a transistor T30 (only one shown), instead of a contact switch 11a. The evaluating device 10 therefore actuates the transistor T30 to actuate the ignition tablet 14a and thus release the air bag 18 (not shown).

We claim:

1. A method of actuating a passenger restraint device mounted on a motor vehicle, comprising the following steps:
    directing electric current from a voltage source to an actuating device to actuate the restraint device;
    storing energy from the voltage source in a storage device, and if the voltage source is disconnected from the actuating device, directing electric current from the storage device to the actuating device to actuate the restraint device; and
    measuring the energy stored within the storage device, and if the energy level of the storage device falls below a predetermined level, interrupting the flow of electric current to the actuating device to maintain a substantially predetermined amount of energy stored within the storage device to actuate other actuating devices.

2. A method as defined in claim 1 further comprising the following steps:
    upon actuation of the restraint device, measuring the flow of electric current to the actuating device; and
    if there is electric current flowing to the actuating device, interrupting the flow of current thereto.

3. A method as defined in claim 3 further comprising the following steps:
    measuring the voltage across the actuating device upon actuating the restraint device; and
    if there is a voltage across the actuating device, interrupting the flow of electric current thereto.

4. A method as defined in claim 1, wherein the energy within the storage device is measured by measuring the voltage across the storage device.

5. A method of actuating a vehicular passenger restraint device comprising the following steps:

directing electric current from a storage device to an actuating device to actuate the actuating device and in turn the passenger restraint device;

measuring the energy supplied by the storage device to the actuating device; and if the energy supplied to the actuating device is greater than a predetermined amount, interrupting the flow of electric current to the actuating device to maintain a substantially predetermined amount of energy within the storage device to actuate other actuating devices.

6. A method as defined in claim 5, wherein the amount of energy supplied to the actuating device is measured by measuring the voltage across the storage device.

7. A method as defined in claim 5, wherein:
the amount of energy supplied to the actuating device is measured by measuring the voltage across the actuating device.

8. A method as defined in claim 7, wherein
upon actuating the passenger restraint device, if there is voltage across the actuating device, interrupting the flow of current therethrough.

9. A method as defined in claim 5, wherein the amount of energy supplied to the actuating device is measured by measuring the electric current flow therethrough.

10. A method as defined in claim 9, wherein
if upon actuating the passenger restraint device, electric current continues to flow through the actuating device, the flow of electric current therethrough is interrupted.

11. An apparatus for actuating a vehicular safety device comprising:
at least two passenger restraint devices, the restraint devices being actuated to protect passengers in the vehicle;
an electric storage device coupled to the passenger restraint devices, the electric storage device being adapted to direct electric current to the passenger restraint devices to actuate the passenger restraint devices; and
first means for generating output signals indicative of the energy supplied by the electric storage device to a respective passenger restraint device upon actuating the passenger restraint device; and
second means responsive to the output signals of the first means for interrupting the flow of electric current to a respective passenger restraint device upon an output signal exceeding a predetermined value to maintain a substantially predetermined amount of energy within the electric storage device to actuate the other passenger restraint devices.

12. An apparatus as defined in claim 11, wherein
the first means includes a first volt meter coupled to the storage device, the first volt meter generating output signals indicative of the voltage across the storage device; and
the second means includes a control unit coupled to the first volt meter and to each restraint device, the control unit being adapted to compare the output signals of the first volt meter to corresponding reference values and to interrupt the flow of electric current to a respective restraint device if an output signal is less than a corresponding reference value.

13. An apparatus as defined in claim 11, wherein the first means includes a plurality of second volt meters, each second volt meter being coupled to a respective restraint device and to the second means to generate output signals indicative of the voltage across the respective restraint device, the second means being adapted to interrupt the flow of electric current to a restraint device upon actuation of that device if the respective second volt meter indicates a voltage across that device.

14. An apparatus as defined in claim 11, wherein
the first means includes a plurality of amp meters, each amp meter being coupled to a respective restraint device and to the second means to generate output signals indicative of the electric current flowing through the respective restraint device, the second means being adapted to interrupt the flow of electric current to a restraint device upon actuation of that device if the respective amp meter indicates electric current flow therethrough.

15. An apparatus for actuating a plurality of passenger restraint devices mounted on a motor vehicle comprising:
an electric storage device coupled to the passenger restraint devices to supply electric current thereto to actuate the restraint devices;
first means for monitoring the energy supplied by the storage device to a respective restraint device and for generating output signals indicative thereof; and
second means responsive to the output signals of the first means for interrupting the flow of electric current from the electric storage device to a restraint device upon the level of the output signals exceeding a predetermined level to maintain a sufficient amount of energy in the storage device to actuate the other restraint devices.

16. An apparatus as defined in claim 15, wherein
the electric storage device includes a capacitor; and
the first means includes a volt meter coupled to the capacitor to generate output signals indicative of the voltage across the capacitor.

17. An apparatus as defined in claim 15, wherein
the first means includes a first volt meter coupled to the storage device to generate output signals indicative of the voltage across the storage device; and
the second means compares the output signals of the first volt meter to corresponding reference values and, if an output signal falls below a corresponding reference value, the second means interrupts the flow of electric current to a respective restraint device.

18. An apparatus as defined in claim 15, wherein
the first means includes a plurality of second volt meters each second volt meter being coupled to a respective passenger restraint device to generate output signals indicative of the voltage across the respective restraint device; and
the second means is adapted to interrupt the flow of electric current to a restraint device if upon actuation of that device the respective second volt meter indicates a voltage across that device.

19. An apparatus as defined in claim 15, wherein
the first means includes a plurality of amp meters, each amp meter being coupled to a respective passenger restraint device to generate output signals indicative of the electric current flowing through the respective restraint device; and the second means is adapted to interrupt the flow of electric current to a restraint device if upon actuation of that device the respective amp meter indicates electric current flowing through that device.

20. An apparatus for actuating a plurality of passenger restraint devices mounted on a motor vehicle comprising:
   an electric storage device coupled to the passenger restraint devices to supply electric current thereto to actuate the devices;
   a first volt meter coupled to the electric storage device to generate output signals indicative of the voltage across the storage device;
   a control unit coupled to the first volt meter and the passenger restraint devices, the control unit being adapted to compare the output signals of the first volt meter to corresponding reference values upon actuation of a restraint device and, if an output signal is less than a corresponding reference value, to interrupt the flow of electric current to the respective restraint device, and thus maintain sufficient energy in the storage device to actuate other restraint devices.

21. An apparatus as defined in claim 20, further comprising:
   a plurality of second volt meters, each second volt meter being coupled to a respective restraint device and the control unit to generate output signals indicative of the voltage across the respective restraint device, wherein
   the control unit is adapted to interrupt the flow of electric current to a respective restraint device if upon actuation of that restraint device, the respective second volt meter indicates a voltage across that device.

22. An apparatus as defined in claim 20, further comprising:
   a plurality of amp meters, each amp meter being coupled to a respective restraint device and the control unit to generate output signals indicative of the electric current flowing through the respective restraint device, wherein
   the control unit is adapted to interrupt the flow of electric current to a respective restraint device if upon actuation of that restraint device, the respective amp meter indicates electric current flowing through that restraint device.

* * * * *

UNITED STATES PATENT AND TRADEMARK OFFICE
CERTIFICATE OF CORRECTION

PATENT NO. : 5,058,920

DATED : October 22, 1991

INVENTOR(S) : Wilfried Burger et al

It is certified that error appears in the above-identified patent and that said Letters Patent is hereby corrected as shown below:

In Column 5, line 23, change "If, however, the 30 ignition" to read --If, however, the ignition...--

Column 6, line 58, claim 3, should read

--3. A method as defined in claim 1 further comprising...--

Column 8, line 55, claim 18, should read

--meters, each second volt meter being...--

Signed and Sealed this

First Day of June, 1993

Attest:

MICHAEL K. KIRK

*Attesting Officer*         *Acting Commissioner of Patents and Trademarks*